United States Patent [19]

Raistrick et al.

[11] Patent Number: 4,719,027

[45] Date of Patent: Jan. 12, 1988

[54] ARTICLE HAVING MAGNETIC PROPERTIES AND PRODUCTION THEREOF

[76] Inventors: James H. Raistrick, 71 Ashbourne Drive, Runcorn, Cheshire WA7 4YL; Stephen J. Battersby, Park Farm, Beare Green, Near Dorking, Surrey RH5 4PX, both of England

[21] Appl. No.: 817,740

[22] PCT Filed: Apr. 2, 1984

[86] PCT No.: PCT/GB84/00114

§ 371 Date: Jan. 30, 1986

§ 102(e) Date: Jan. 30, 1986

[87] PCT Pub. No.: WO84/02445

PCT Pub. Date: Jul. 5, 1984

[30] Foreign Application Priority Data

Apr. 2, 1984 [GB] United Kingdom ........... 84/00114

[51] Int. Cl.[4] ........................ C04B 35/04; H01F 1/06; H01F 1/26

[52] U.S. Cl. .............................. 252/62.54; 252/62.51; 252/62.53

[58] Field of Search ................ 252/62.54, 62.53, 62.51

[56] References Cited

U.S. PATENT DOCUMENTS

| | | | |
|---|---|---|---|
| 3,795,539 | 5/1974 | Dimino | 252/62.54 |
| 4,001,363 | 1/1977 | Koppens | 252/62.54 |
| 4,105,572 | 8/1978 | Gorondy | 252/62.54 |
| 4,272,749 | 6/1981 | Tuji | 252/62.54 |
| 4,308,155 | 12/1981 | Tada et al. | 252/62.54 |
| 4,454,282 | 6/1984 | Bradshaw et al. | 252/62.54 |
| 4,493,778 | 1/1985 | Iqbal | 252/62.54 |
| 4,505,982 | 3/1985 | Horie et al. | 252/62.54 |
| 4,558,077 | 10/1985 | Gray | 252/62.54 |
| 4,562,019 | 12/1985 | Inoue | 252/62.54 |

FOREIGN PATENT DOCUMENTS 511749 1/1978 Australia .

OTHER PUBLICATIONS

Chemicals Abstracts 85(2) 13056c, Stabilization of Magnetic Material-Grafted Polymer Composites.

Chemical Abstracts 91(6) 48591z, Thin Layer Magnets.

Murayama et al., Chem. Abstracts 85(1976), #13056.

*Primary Examiner*—Arthur P. Demers

*Attorney, Agent, or Firm*—Cushman, Darby & Cushman

[57] ABSTRACT

A shapeable composition comprising a homogeneous mixture of (a) at least one particulate ferrite material having magnetic properties, (b) at least one water-soluble or water-dispersible organic polymeric material, and (c) water, in the composition the components (a), (b) and (c) being present in a proportion by volume of the composition of respectively, 40 to 90%, 2 to 25%, and not more than 60%, a product produced therefrom, and a process for producing said product by removing water from the composition. The composition optionally contains additives capable of insolubilizing the organic polymeric material with respect to water.

14 Claims, No Drawings

ARTICLE HAVING MAGNETIC PROPERTIES AND PRODUCTION THEREOF

This invention relates to a shaped article having magnetic properties, particularly to a shaped article comprising particulate material having magnetic properties, to a process for the production of said article, and to a composition for use in such production.

Within the scope of the terms shaped article having magnetic properties, and particulate material having magnetic properties, there are included articles and materials whose properties may be described as ferromagnetic or ferrimagnetic. Both these latter terms include articles and materials which once magnetised remain magnetised when removed from the influence of a magnetic field, and also articles and materials which are capable of being magnetised but which do not remain magnetised when removed from the influence of a magnetic field. Such articles and materials may be considered to be, respectively, permanently and temporarily magnetisable, and are frequently referred to as "hard" and "soft" respectively.

The metals iron, coibalt, and nickel are all ferromangetic. They may be either permanently or temporarily magnetisable depending on the nature of or the amount of additional element or elements with which they may be alloyed.

Materials which are ferrimagnetic include Ba $Fe_6O_{19}$, which is permanently magnetisable, and (Mn, Zn) $Fe_2O_4$, which is temporarily magnetisable. Such examples of ferrimagnetic materials are examples of a class of materials referred to as ferrites. The term ferrite is a term well known in the art. Ferrites are magnetic oxides containing iron as a major metallic component and in addition another metal component, e.g. manganese, zinc, lead, strontium, barium, lithium or nickel. The term can include spinels, perovskites, magnetoplumbites, and garnets.

Shaped articles of metals or alloys, for example, iron, cobalt, and/or nickel and/or alloys thereof, may be made by conventional metal shaping techniques, for example, by powder compaction or by casting at high temperature. The present invention relates to the production of shaped articles from particulate materials having magnetic properties, and although it may be applied to the production of shaped articles from metallic particulate magnetic materials, it is also suitable for use in the production of shaped articles from non-metallic particulate magnetic materials, for example ferrites, which may not normally be produced by metal shaping techniques.

Shaped articles of ferrites may be made, for example, by a powder compaction process in which the powdered ferrite is compacted under pressure in a suitably shaped mould and the powder is subsequently sintered by heating at a high temperature which may be in excess of 1200° C. Controlled heating and cooling rates may be required, as may be heating for some hours at the peak temperature. The presence of air or air enriched with oxygen may also be required.

Shaped articles of ferrites may be made from a composition comprising, ferrite powder and a solution of a polymer binder. The article may be shaped, for example, by extrusion, injection moulding, or compression moulding, pyrolysing the polymer binder and finally sintering the ferrite powder.

Shaped articles of ferrites may also be made by filling of plastics materials, although in this case the article generally contains a relatively low proportion of ferrite and thus possesses relatively poor magnetic properties.

Permanently magnetisable materials are used in a wide variety of applications, for example, in motors and in loud speakers. Temporarily magnetisable materials are used in transformers, in antennae rods, in recording heads and in memory cores.

Furthermore, certain ferrites possess the unusual feature of being able to damp vibrations. Articles made in the manner described later may have a good combination of high modulus and good vibration damping.

The present invention relates to shaped articles of particulate materials having magnetic properties, and to the production of such articles by a process which does not involve a lengthy and expensive sintering step, and which contain a high volume proportion of the particulate material.

According to the present invention there is provided a process for the production of a shaped article of a particulate material having magnetic properties which method comprises shaping a homogeneous mixture of (a) at least one particulate material having magnetic properties, (b) at least one water-soluble or water-dispersible organic polymeric material, and (c) water, and removing water from the thus formed shaped article, in the composition the components (a), (b), and (c) being present in a proportion by volume of the composition of respectively, 40 to 90%, 2 to 25%, and not more than 60%.

In a further embodiment of the present invention there is provided a shapeable composition comprising a homogeneous mixture of (a) at least one particulate material having magnetic properties, (b) at least one water-soluble or water-dispersible organic polymeric material, and (c) water in the composition the components (a), (b) and (c) being present in proportions by volume of the composition of respectively 40 to 90%, 2 to 25%, and not more than 60%.

There is also provided a shaped article of a particulate material having magnetic properties produced by removing water from the composition hereinbefore described.

The particulate material having magnetic properties will generally be referred to hereinafter as the particulate material.

In producing the shapeable composition the components thereof should be thoroughly mixed so as to form a homogeneous mixture.

For example, the components of the composition are preferably mixed under conditions of high shear, for example in a bladed high shear mixer. If desired, and where the composition has a suitable consistency, a composition so formed may be further mixed under conditions of high shear by passing the composition repeatedly through the nip between a pair of rollers which may be rotating at the same or at different peripheral speeds.

The mixing may be effected at elevated temperature in order, for example, to reduce the viscosity of the composition and thus aid the mixing. However, the elevated temperature, should not be such as to result in premature drying of the composition by loss of water nor in excessive loss of water from the composition by evaporation.

The homogeneous composition of the invention may be shaped by a variety of techniques, depending on the consistency of the composition. Thus where the composition comprises a relatively large proportion of water in the range up to 60% by volume of the composition the composition may be sufficiently fluid as to be capable of being cast in a suitably shaped mould.

The composition of the invention may contain a proportion of water, e.g. up to 30% by volume, such that the composition has a dough-like consistency, and the composition may be shaped by techniques known in the plastics or rubber processing art. For example, where the composition has a dough-like consistency it may be shaped by extrusion, e.g. into a rod or tube shape or by injection moulding into a desired shape, or it may be calendered to produce a sheet-like form. The composition may also be shaped by compression moulding of the composition in a suitably shaped mould.

Compositions having a dough-like consistency are preferred as it is generally possible to use plastics or rubber processing equipment with such compositions, such compositions generally contain a relatively low proportion of water and thus there is a reduced amount of water to remove from the composition, and the shaped articles produced from such compositions are generally of higher flexural strength.

The temperature at which shaping of the composition may be effected may depend on the nature of the components of the composition and their relative proportions. Where the composition is to be shaped under relatively high pressure the composition may be shaped at or near ambient temperature. However, we have found that, particularly where the composition has the characteristics of a thermoplastic, it may be desirable, or even necessary, in order to readily effect the shaping process, to use an elevated temperature in order effectively to shape the composition. A suitably elevated temperature may be chosen by means of simple experiment.

In the final step of the process for the production of the shaped article water is removed from the shaped composition, that is it is dried. Drying may be effected merely by allowing the water to evaporate. However, in order to speed up the drying process it is preferred to dry the shaped composition at elevated temperature, for example at a temperature greater than 50° C. A temperature of 100° C. or greater may be used. However, the elevated temperature, and the length of time at the elevated temperature, should not be such as to result in substantial reduction in the strength of the shaped article, which may be brought about, for example, by degradation of the polymeric material at elevated temperature.

The shaped article of the invention may have a high flexural strength, for example, a flexural strength in excess of 40 MPa. The shaped article may have a flexural strength in excess of 100 MPa.

As the shaped article comprises an organic polymeric material which is water-soluble or water-dispersible the article will be sensitive to water. Indeed, it may lose dimensional stability when contacted with water, particularly when soaked in water, and in a preferred embodiment of the invention the composition also comprises at least one additive which is capable of reacting with the polymeric material to insolubilise the material with respect to water. Use of such an additive substantially increases the dimensional stability of the shaped article when the article is contacted with water.

Where the composition contains such an additive the final step of the process for the production of the shaped article comprises drying of the shaped composition to remove the water from the composition and reacting the additive with the organic polymeric material in order to insolubilise the latter material with respect to water. In this case this final step is referred to as setting.

The conditions under which setting of the shaped composition may be effected will depend on the nature of the components of the composition, and in particular on the nature of the organic polymeric material and on the nature of the additive reactive therewith. Suitable conditions for use in effecting the setting reaction will be disclosed hereafter in respect of compositions containing specific organic polymeric materials and additives reactive therewith. Setting of the shaped composition may be effected at or near ambient temperature or it may be effected at elevated temperature, for example at a temperature in excess of 50° C. A temperature of up to 100° C. or even greater may be used. Elevated temperatures may be desirable in order to initiate reaction of the additive with the organic polymeric material, or at least to increase the rate of this reaction. The elevated temperature, and the length of time at such elevated temperature should not be such as to result in substantial reduction in the strength of the product.

Where particularly high flexural strength shaped articles are to be produced it is preferred that the components of the composition of the invention are selected such that a test composition comprising 63% by volume of particulate material, 7% by volume of water-soluble or water-dispersible organic polymeric material and 30% by volume of water, when extruded in a capillary rheometer at an extrusion pressure up to a maximum of 500 atmospheres undergoes and increase of at least 25%, and preferably at least 50%, in shear stress when a ten-fold increase in the shear rate of the test composition is effected when the shear rates as measured are within the range 0.1 to 5 $second^{-1}$.

A capillary rheometer in which the test composition is extruded comprises a piston in a cylindrical barrel and a capillary orifice through which the test composition may be extruded.

The shear stress in kN $cm^{-2}$ is defined by $$\frac{F\,d}{L\,D^2}$$

and the shear rate in $second^{-1}$ by $$\frac{2\,v\,D^2}{15\,d^3}$$

where D is the diameter of the barrel of the rheometer in cm, v is the rate of travel of the piston in the barrel of the rheometer in cm $min^{-1}$, d is the diameter of the capillary of the rheometer in cm, L is the length of the capillary of the rheometer in cm, and F is the force in kN applied to the piston of the rheometer. In general, D will be in the range 1 to 3 cm, d in the range 0.2 to 0.5 cm, and L in the range 5 d to 20 d.

The particulate material in the test composition should not be of a size so great nor of such a shape that the particulate material itself inhibits passage of the composition through the capillary of the rheometer. For use in the capillary rheometer test particulate material having a size which results in a readily extrudable composition will be chosen, and a size in the range 10 to 100 microns will generally be suitable. The composition, and shaped article, of the invention are not limited to particulate material having a size in this range.

A shaped article produced from the composition of the invention will be of higher flexural strength where the particulate material and organic polymeric material together are selected so that the test composition satisfies the aforementioned criteria of the capillary rheometer test than is the case where the particulate material and the organic polymeric material selected are such the the test compositions does not satisfy the aforementioned criteria.

For example, where the organic polymeric material and the particulate material are selected so that the test composition satisfies the aforementioned criteria a shaped article produced from a composition containing these materials will have a flexural strength higher than that of (1) a shaped article produced from a composition containing the same organic polymeric material and a different particulate material which in combination do not satisfy the criteria of the capillary rheometer test, and (2) a shaped article produced from a composition containing the same particulate material and a different organic polymeric material which in combination do not satisfy the criteria of the capillary rheometer test.

Suitable combinations of particulate material and organic polymeric material which in the test composition satisfy the aforementioned capillary rheometer test will be disclosed hereinafter.

In general, the greater is the change in shear stress observed when the shear rate is increased ten-fold the greater will be the flexural strength of the shaped article produced from the composition of the invention, and for this reason it is preferred that the test composition undergoes an increase of at least 75% in shear stress when a ten-fold increase in shear rate of the test composition is effected.

The test composition for use in the capillary rheometer test should of course be thoroughly mixed and be sufficiently fluid that the composition itself is capable of being extruded in the capillary rheometer. In order that the test composition should have sufficient fluidity that shear rates in the range of 0.1 to 5 second$^{-1}$ are obtained it may be necessary to carry out the test at elevated temperature, for example at a temperature greater than 50° C., e.g. at about 80° C. On the other hand, it may be necessary, particularly where the test composition is of high fluidity, to carry out the capillary rheometer test at a temperature below ambient temperature. In effecting the extrusion the composition should not separate into its component parts, for example, water should not tend to separate from the composition.

In order to produce an extrudable composition it may be necessary to select a suitable molecular weight of organic polymeric material for use in the test composition. The composition of the invention is not of course limited to use of a material of the selected molecular weight. The molecular weight is merely selected for the purposes of the test.

For particularly high flexural strength shaped articles it is preferred that not more than 2%, and more preferably not more than 0.5%, of the total volume of the article comprises pores having a maximum dimension exceeding 100 microns, preferably 50 microns, and more preferably 15 microns, as measured by the method of quantitative microscopy. These pore size criteria do not include pores which may be present in the particulate material, for example, where the particulate material comprises hollow particles.

The production of such a preferred shaped article is assisted by application of high shear during mixing of the composition, which may be effected in the substantial absence of air, for example, under vacuum and/or by application of at least a moderate pressure, e.g. an applied pressure of 1 to 5 MPa in the shaping step, particularly with a dough-like composition.

Quantitative microscopy is a technique well known in the art. A surface of a sample of the shaped article is polished to produce a plane surface on the sample, the sample is washed to remove the polishing debris from the surface, and the surface is illuminated to ensure that the holes in the surface are contrasted with the plane parts of the surface, and the surface is viewed by means of an optical microscope, typically at a magnification of ×100, and the holes exceeding 100 microns, or 50 microns or 15 microns in size, are determined, as described in "Quantitative Microscopy" by De Hoff and Rhines, McGraw Hill 1968. Sufficient area of the surface of the sample should be viewed to reduce the statistical error, and usually, 1000 holes are counted. The sample is then subjected to further polishing in order to expose another surface and the optical examination is repeated. In general ten such surfaces are examined.

It is also preferred, for additional improvements in flexural strength, that the total volume of pores in the shaped article expressed as a proportion of the apparent volume of the article, including the pores, does not exceed 20%. Porosities not exceeding 15%, and even porosities not exceeding 10% are more preferred. The porosity may even be less than 2%. These porosity criteria exclude pores which may be present in the particulate material, for example, where the particulate material comprises hollow particles.

Low porosity is a feature of shaped articles produced from compositions in which the organic polymeric material and the particulate material are selected so as to satisfy the criteria of the capillary rheometer test.

In the composition of the invention the particulate material is insoluble in water and is substantially unreactive with water, although we do not exclude use of particulate material which may be very slightly reactive with water.

The dimensions of the particles of the particulate material may vary over a broad range. Where the particulate material has a small size, however, undesirably large proportions of water may be required in order to produce a composition which is readily shapeable, and for this reason it is preferred, although not essential, that the median particle size is greater than 0.3 micron, more preferably greater than 3 microns.

The particulate material may comprise a plurality of particle sizes. For example, the particulate material may comprise a first fraction and a second fraction of size less than that of the first fraction.

The use of such a plurality of particle sizes results in good packing of particles in the product and also may lead to a reduction in the proportion or organic polymeric material which otherwise may be required.

Mixtures of different particulate materials having magnetic properties may be used.

The particulate material having magnetic properties may be for example a metal or alloy, e.g. iron, nickel, and/or cobalt, and/or alloys thereof.

Shaped articles made of ferrites have a wide variety of applications, and for this reason the particulate material having magnetic properties may suitably be a ferrite.

Ferrites are magnetic oxides containing iron as a major metallic component and in addition another metal component. The other metal component may be, for example, manganese, zinc, lead, strontium, barium, lithium or nickel. Examples of ferrites include (Mn, Zn) $Fe_2O_4$, $BaFe_{12}O_{19}$, $MnFe_2O_4$ and (Ni, Zn) $Fe_2O_4$.

Many other examples of ferrites are described in the art.

The composition, and the shaped article produced therefrom, may comprise particulate material other than a particulate material having magnetic properties.

The composition, and the shaped article produced therefrom, may include fibrous material. Although the fibrous material may be in the form of random, chopped fibre, difficulty may be experienced in incorporating such fibrous material into the composition. For this reason the fibrous material is preferably in the form of a mat, which may be woven or non-woven. The mat may be pressed into the composition of the invention, or it may be formed in situ, e.g. by filament winding.

The particulate material may be present in the composition of the invention in a proportion of 40 to 90% by volume. It is preferred to use a relatively high proportion of particulate material, for example a proportion in the range 60 to 90% by volume.

Such preferred compositions may contain a relatively low proportion of organic polymeric material, which material will generally be inflammable, and it is thus of advantage that the shaped article of the invention contains a relatively low proportion of such material. Also, compositions containing a high proportion of particulate material will generally contain a relatively low proportion of water. This is of advantage as there is then a lower proportion of water to remove from the composition during production of the shaped article.

The organic polymeric material in the composition of the invention should be water-soluble or water-dispersible. The function of the organic polymeric material is to aid in the processing of the composition, e.g. to aid in the production of a composition which is readily shaped, e.g. a composition of dough-like consistency, and to provide shape-retaining properties to the shaped article of the invention.

It is preferred that the organic polymeric material is soluble in water, rather than water-dispersible, and that the polymeric material is film-forming and contains groups, for example, hydroxyl or carboxylic acid groups, which have an affinity for the particulate material.

Examples of organic polymeric materials include hydroxy propyl methyl cellulose, polyethylene oxide, polyethylene glycol, polyacrylamide, and polyacrylic acid. A particularly preferred organic polymeric material which, with a number of different particulate materials having magnetic properties in the form of a test composition satisfies the criteria of the aforementioned capillary rheometer test, is a hydrolysed polymer or copolymer of a vinyl ester, e.g. a hydrolysed vinyl acetate polymer or copolymer. The polymer may be a copolymer of vinyl acetate and a monomer copolymerisable therewith, but it is preferably a hydrolysed poly(vinyl acetate).

The degree of hydrolysis of the vinyl acetate (co)polymer has a bearing on whether or not the (co)polymer in combination with a particulate material in the test composition satisfies the aforementioned criteria of the capillary rheometer test. In order that in the capillary rheometer test an increase of at least 25% in shear stress should be produced by the ten-fold increase in shear rate, it is preferred that the degree of hydrolysis of the vinyl acetate (co)polymer be at least 50% but not more than 97%, and more preferably in the range 70 to 90%, that is, it is preferred that at least 50% but not more than 97%, and more preferably 70% to 90% of the vinyl acetate units in the polymer or copolymer, are hydrolysed to the alcohol form.

For a given proportion of hydrolysed vinyl acetate (co)polymer in the composition of the invention the properties of the shaped article produced therefrom are relatively insensitive to variations in the molecular weight of the hydrolysed vinyl acetate (co)polymer.

In general, however, the molecular weight of the hydrolysed vinyl acetate (co)polymer will be at leat 3000, e.g. in the range 5000 to 125,000. Such (co)polymers are readily available. The (co)polymer may have a higher molecular weight.

In the composition of the invention there is present 2 to 25% of organic polymeric material by volume of the composition. The ease of shaping of the composition generally improves with increase in the proportion of polymeric material in the composition, and a proportion of at least 7% by volume is preferred. On the other hand as the polymeric material is generally capable of burning a proportion of not more than 20% by volume of polymeric material is preferred.

The proportion of water in the composition has an effect on the properties of the shaped article produced from the composition. In order to produce an article of particularly high flexural strength the composition should contain no more than 30% by volume of water. It is preferred to use as low a proportion of water as possible consistent with producing a composition which is shapeable. We prefer to use less than 20% by volume of water. In general it will be found necessary to use at least 5% be volume of water. However, a proportion of water may be used in the composition which is greater than that which would result in production of a very high strength article and some strength may be sacrificied in order to produce a composition which is more readily shaped.

Where the high green strength is desired in the moulded composition of the invention, that is before setting of the composition, the composition may suitably comprise a gelling agent for the organic polymeric material, that is a compound which forms labile bonds with the organic polymeric material.

An alternative way of achieving high green strength in the composition is to include in the composition a proportion of an organic polymeric material which is soluble in the water of the composition at elevated temperature but which forms a gel at low temperature, e.g. at or near ambient temperature. For example the composition may also comprise a proportion of a substantially fully hydrolysed poly(vinyl acetate) which is soluble in the water of the composition at elevated temperature but which forms a gel at ambient temperature.

It is a preferred feature of the invention that the composition comprises an additive capable of reacting with the organic polymeric material to insolubilise the material with respect to water.

The nature of this additive will depend on the particular organic polymeric material in the composition.

Where the organic polymeric material comprises a plurality of reactive functional groups the additive may be a material reactive with the functional groups under the conditions used in forming the shaped article of the invention from the composition. In this case the insolubilisation of the organic polymeric material with respect to water may be achieved by cross-linking of the material. For example, where the polymeric material comprises a plurality of hydroxyl groups, e.g. as in a hydrolysed vinyl ester polymer or copolymer such as hydrolysed poly(vinyl acetate), and the additive may be a compound of a polyvalent metal capable of reacting with the hydroxyl groups. Particular examples of suitable compounds of a polyvalent metal include compounds of aluminium, $Al_2(OH)_5NO_3$, and $Al_2(OH)_5$ halide, for example, $Al_2(OH)_5Cl$. Other examples of compounds of a polyvalent metal include $Zr(OH)_2Cl_2$, $(NH_4)_2Cr_2O_7$ and $Cr(OH)_{1.8}(NO_3)_{1.2}$.

Selection of suitable combinations of water-soluble or water-dispersible organic polymeric materials and insolubilising additives may be made by reacting mixtures of such materials and additives and testing the product of reaction for water insolubility.

In effecting setting of the composition comprising such an additive the additive in the composition is reacted with the polymeric material to insolubilise the material and water is removed from the composition. Where the additive is a polyvalent metal compound reaction is suitably effected at elevated temperature. For example, the temperature may be greater than 100° C., which temperature serves to remove the water in the composition. A temperature of, for example, up to 250° C. may be used.

Where the polymeric material comprises a plurality of hydroxyl groups the additive capable of reacting with the polymeric material to insolubilise the material with respect to water may itself be an organic compound reactive with the hydroxyl groups, for example, a dialdehyde, e.g. glyoxal.

In this case a suitable reaction temperature is ambient temperature. However, elevated temperatures are suitably used, e.g. up to about 100° C., in order to remove the water from the composition and to accelerate the reaction.

In the composition of the invention the proportion of additive capable of reacting with the polymeric material will depend on the particular organic polymeric material and the particular additive in the composition.

In general the composition will contain a proportion of additive in the range 5 to 100% by volume of the organic polymeric material in the composition e.g. 10 to 50% by volume.

It is preferred to select a proportion of additive which is sufficient not merely to insolubilise the organic polymeric material with respect to water but which reacts with the polymeric material to produce a polymeric product which swells at most only to a limited extent in water, for example, which takes up not more than 50% by weight of water when the product of reaction of the organic polymeric material and the insolubilising additive is soaked in water. Suitable proportions may be selected by test on mixtures of organic polymeric material and insolubilising additive.

In a particularly preferred embodiment of the invention the composition of the invention also comprises an additive capable of effecting coupling between the polymeric material and the surface of the particulate material having magnetic properties in the composition.

Although shaped articles having high flexural strength may be produced from compositions which do not contain such an additive capable of effecting coupling it has been found that such articles may suffer a substantial loss in flexural modulus when contacted with water. Where the composition from which the shaped article is produced contains such an additive capable of effecting coupling the loss of flexural modulus of the article when the article is contacted with water, if any, is very much reduced.

The coupling additive which may suitably be used in a composition will depend on the nature of the particular material and the organic polymeric material in the composition.

It is preferred that the additive capable of insolubilising the organic polymeric material be the same as the additive capable of effecting coupling between the polymeric material and the particulate material.

For example, where the additive capable of reacting with the organic polymeric material to insolubilise the latter with respect to water is a polyvalent metal compound certain of the latter compounds are also capable of effecting coupling between ferrite particulate materials and the organic polymeric material. Suitable additive to fulfil both these functions include $Al_2(OH)_5CL$, $(NH_4)_2Cr_2O_7$, $Cr(OH)_{1.8}(NO_3)_{1.2}$ and $Al_2(OH)_5NO_3$.

In general the additive capable of effecting coupling, when diferent from the additive capable of reacting with the organic polymeric material to insolubilise the latter material with respect to water will be present in the composition in a relatively low proportion, although the proportion required may depend on the particle size of the particulate material. For example, the additive may be present in a proportion of 0.01 to 3% by volume of the particulate material in the composition.

The invention is illustrated by the following examples in which all parts are parts by volume, unless otherwise stated.

EXAMPLE 1

128 parts of a particulate ferrite, $BaFe_{12}O_{19}$, having a particle size of 10 microns, and 22.8 parts of hydrolysed poly(vinyl acetate) (Gohsenol GH17S Nippon Gohsei, degree of hydrolysis 88% degree of polymerisation 2000) were thoroughly mixed in a bladed mixer. 4 parts of resorcinol in 15 parts of water were mixed with 40 parts of an aqueous solution containing 30 parts of water and 10 parts of aluminium hydroxy chloride containing 12.1% w/w Al, 8.75% w/w Cl, the latter solution having a viscosity of 18 cps, and the resultant solution added to the mixed solids in the bladed mixer to form a crumble.

The crumble was then charged to a twin-roll mill the rollers of which were heated to a temperature of 70° C. and the crumble was formed into sheet on the mill, the sheet being passed repeatedly through the nip between the rolls. The milling was continued for 5 minutes during which time some of the water evaporated, and the resultant sheet was removed from the mill.

The sheet contained 128 parts of particulate ferrite, 22.8 parts of hydrolysed poly(vinyl acetate), 10 parts of aluminium hydroxy chloride, 4 parts of resorcinol, and 45 parts of water.

The sheet was then placed between two sheets of polyethylene terephthalate the faces of which were coated with mould release agent and the sheet was pressed in a hydraulic press at a temperature of 80° C. and a pressure of 10 MPa for 10 minutes.

The platens of the press were then cooled by flowing cold water through the platens, the sheet was removed from the press, and the sheets of polyethylene terephthalate were removed from the sheet.

Setting of the sheet was completed by placing the sheet between two flat pieces of wood, the sheet was allowed to stand for 1 day at 20° C., it was then heated at 80° C. for 1 day, and finally it was heated at 180° C. for 1 hour.

The sheet had a flexural strength of 112.6 MPa and a flexural modulus of 48.3 GPa, and contained 78% by volume of ferrite.

The sheet had the following magnetic properties.

| | |
|---|---|
| Remenance (Br) | 1430 Gauss |
| Coercivity (Hc) | 750 Oersteds |
| $BH_{max}$ product | $0.30 \times 10^6$ gauss Oersteds |
| saturation magnetisation | 2720 gauss. |

EXAMPLE 2

The mixing, shaping, and setting procedure of Example 1 was repeated on a composition comprising

| | |
|---|---|
| (Mn, Zn) ferrite 150 micron mean size | 669.6 parts |
| (Mn, Zn) ferrite 1 micron mean size | 224.1 parts |
| Hydrolysed poly(vinyl acetate) Gohsenol GH 17S | 115.8 parts |
| Polyviol VO3-140 (Wacker-Chemie) degree of hydrolysis 86-89%, degree of polymerisation 300 | 21.0 parts |
| Aluminium hydroxy chloride solution (as used in Example 1) | 203.3 parts |
| Water | 140 parts |

The sheet, which contained 83% by volume of ferrite, had a flexural strength of 106 MPa and a flexural modulus of 44.7 GPa.

| The sheet had the following magnetic properties | |
|---|---|
| Remenance | 355 gauss |
| Coercivity (Hc) | 9.85 Oersteds |
| Initial permeability | 19.8 |
| Maximum permeability | 26.0 |
| Saturation magnetisation | 4480 gauss |

A ring was cut from the sheet and the low field permeability of the ring was measured by comparing the inductance of a coil wound on the ring with the theoretic inductance for an air-cored coil. The low field permeability was 19.1.

EXAMPLE 3

The mixing, shaping, and setting procedure of Examples was repeated on a composition comprising

| | |
|---|---|
| (Mn, Zn) ferrite 150 micron mean size | 54.2 parts |
| (Mn, Zn) ferrite 1 micron mean size | 18.1 parts |
| Hydrolysed poly(vinyl acetate) Gohsenol GH 17S | 29.3 parts |
| Polyviol VO3-140 | 5.4 parts |
| Aluminium hydroxy chloride solution (as used in Example 1) | 42.7 parts |
| Water | 14.3 parts |

The sheet which was produced contained 61% by volume of ferrite and had a low field permeability, measured as described in Example 2, of 7.2.

I claim:

1. A shapeable composition capable of being shaped on rubber or plastics processing equipment and comprising a homogeneous mixture of (a) at least one particulate ferrite material having magnetic properties, (b) at least one water-soluble or water-dispersible organic polymeric material, and (c) water, in the composition the components (a), (b) and (c) being present in a proportion by volume of the composition of respectively, 40 to 90%, 2 to 25%, and not more than 30%.

2. A shapeable composition as claimed claim 1 characterised in that the particulate ferrite material having magnetic properties has a medium particle size of greater than 0.3 micron.

3. A shapeable composition as claimed in claim 1 characterised in that the particulate ferrite material having magnetic properties comprises a plurality of particle sizes.

4. A shapeable composition as claimed in claim 1 characterised in that the composition comprises particulate ferrite material having magnetic properties in a proportion of 60% to 90% by volume.

5. A shapeable composition as claimed in claim 1 characterised in that the components of the composition are selected such that a test composition comprising 63% by volume of particulate ferrite material having magnetic properties, 7% by volume of water-soluble or water-dispersible organic polymeric material, and 30% by volume of water, when extruded in a capillary rheometer at an extrusion pressure up to a maximum of 500 atmospheres undergoes an increase of a least 25% in shear stress when a tenfold increase in the shear rate of the test composition is effected when the shear rates as measured are within the range of 0.1 to 5 $second^{-1}$.

6. A shapeable composition as claimed in claim 1 characterised in that the organic polymeric material comprises a hydrolysed polymer or copolymer of a vinyl ester.

7. A shapeable composition as claimed in claim 6 characterised in that the organic polymeric material comprises hydrolysed poly(vinyl acetate).

8. A shapeable composition as claimed in claim 1 characterised in that the organic polymeric material is present in a proportion of 7% to 20% by volume.

9. A shapeable composition as claimed in claim 8 characterised in that the composition contains 5% to 20% by volume of water.

10. A shapeable composition as claimed in claim 1 characterised in that the composition comprises an additive capable of reacting with the organic polymeric material to insolubilise the material with respect to water.

11. A shapeable composition as claimed in claim 10 characterised in that the additive is aluminium hydroxy chloride.

12. A shapeable composition as claimed in claim 10 characterised in that the additive is present in a proportion of 5% to 100% by volume of the organic polymeric material in the composition.

13. A shapeable composition as claimed in claim 1 characterised in that the composition comprises an additive capable of effecting coupling between the organic polymeric material and the surface of the particulate ferrite material having magnetic properties.

14. A shapeable composition as claimed in claim 13 characterised in that the additive capable of insolubilising the organic polymeric material is the same as the additive capable of effecting coupling.

* * * * *